United States Patent
Nilakantan

(10) Patent No.: US 8,052,211 B2
(45) Date of Patent: Nov. 8, 2011

(54) ANTI-WHIPLASH VEHICLE SYSTEM WITH ACTIVE HEAD RESTRAINT

(75) Inventor: Gaurav Nilakantan, Newark, DE (US)

(73) Assignee: University of Delaware, Newark, DE (US)

( * ) Notice: Subject to any disclaimer, the term of this patent is extended or adjusted under 35 U.S.C. 154(b) by 264 days.

(21) Appl. No.: 12/260,221

(22) Filed: Oct. 29, 2008

(65) Prior Publication Data
US 2009/0108645 A1   Apr. 30, 2009

Related U.S. Application Data

(60) Provisional application No. 60/983,405, filed on Oct. 29, 2007.

(51) Int. Cl.
*B60N 2/42* (2006.01)
*B60R 21/00* (2006.01)

(52) U.S. Cl. .................. 297/216.12; 297/216.1; 297/408

(58) Field of Classification Search ............. 297/216.12, 297/216.15, 216.16, 216.17, 216.18, 391, 297/408
See application file for complete search history.

(56) References Cited

U.S. PATENT DOCUMENTS

| | | | |
|---|---|---|---|
| 4,285,545 A * | 8/1981 | Protze | 297/483 |
| 5,056,508 A | 10/1991 | Brunell | |
| 5,181,763 A | 1/1993 | Dellanno et al. | |
| 5,290,091 A | 3/1994 | Dellanno et al. | |
| 5,378,043 A | 1/1995 | Viano et al. | |
| 5,580,124 A | 12/1996 | Dellanno | |
| 5,626,203 A * | 5/1997 | Habib | 180/274 |
| 5,833,312 A | 11/1998 | Lenz | |
| 5,938,279 A | 8/1999 | Schubring et al. | |
| 6,019,424 A | 2/2000 | Rückert et al. | |
| 6,082,817 A | 7/2000 | Müller | |
| 6,270,161 B1 | 8/2001 | Filippo | |
| 6,333,686 B1 | 12/2001 | Waltzer | |
| 6,435,591 B1 | 8/2002 | Nilsson | |
| 6,435,592 B2 | 8/2002 | Nilsson | |
| 6,565,150 B2 | 5/2003 | Fischer et al. | |
| 6,779,840 B1 * | 8/2004 | Farquhar et al. | 297/216.12 |

(Continued)

FOREIGN PATENT DOCUMENTS

WO    WO 98/40238    9/1998

(Continued)

OTHER PUBLICATIONS

Yuen, Michael, et al.; "Development of an Anti-Whiplash Seat"; Australian Transport Safety Bureau; Project Test Results; 43 pp; Canberra Act 2608.

(Continued)

*Primary Examiner* — David Dunn
*Assistant Examiner* — Philip Gabler
(74) *Attorney, Agent, or Firm* — RatnerPrestia

(57) ABSTRACT

An active head restraint system includes a fluid driver assembly coupled to a vehicle seat assembly. The fluid driver assembly is actuatable in response to a predetermined movement of the vehicle seat assembly. A fluid driven assembly is in fluid communication with the fluid driver assembly. The fluid driven assembly is actuated in response to actuation of the fluid driver assembly. A headrest is pivotable about an axis. The headrest is coupled to the fluid driven assembly such that the fluid driven assembly pivots the headrest about the axis during actuation of the fluid driver assembly. A seat assembly incorporating the active head restraint system is also disclosed.

20 Claims, 5 Drawing Sheets

U.S. PATENT DOCUMENTS

| | | | |
|---|---|---|---|
| 6,938,953 B2 | 9/2005 | Håland et al. | |
| 6,955,397 B1 | 10/2005 | Humer | |
| 6,962,392 B2 | 11/2005 | O'Connor | |
| 6,983,996 B2 | 1/2006 | Svantesson | |
| 6,991,287 B1 | 1/2006 | Ogawa et al. | |
| 7,021,706 B2 | 4/2006 | Aufrere et al. | |
| 7,144,081 B2 | 12/2006 | Baltzer | |
| 2002/0074843 A1* | 6/2002 | Malsch et al. | 297/408 |
| 2002/0093231 A1* | 7/2002 | Estrada et al. | 297/216.12 |
| 2005/0062330 A1* | 3/2005 | Eberle et al. | 297/408 |
| 2005/0146174 A1* | 7/2005 | Maddelein et al. | 297/216.1 |
| 2006/0290160 A1* | 12/2006 | Tencer et al. | 296/68.1 |

FOREIGN PATENT DOCUMENTS

| | | |
|---|---|---|
| WO | WO 02/085664 | 10/2002 |

OTHER PUBLICATIONS

Jakobsson, Lotta, et al.; "WHIPS—Volvo's Whiplash Protection Study"; Accident Analysis and Prevention; (2000); vol./Issue 32; pp. 307-319.

Johnson Controls; "Playing it Safe"; web page; 1 p.

Autoliv, Inc.; "Anti-Whiplash Seat"; web page; 2006; 1 p.

Johnson Controls; "Johnson Controls Introduces New Anti-Whiplash Standards"; web page; 2007; 3 pp.

\* cited by examiner

ANTI-WHIPLASH VEHICLE SYSTEM WITH ACTIVE HEAD RESTRAINT

CROSS-REFERENCE TO RELATED APPLICATIONS

This application claims priority from U.S. Provisional Application Ser. No. 60/983,405 titled "Anti-Whiplash Vehicle System with Active Head Restraint," filed Oct. 29, 2007, incorporated herein by reference.

BACKGROUND OF THE INVENTION

Whiplash injuries are among the most common injuries that occur during automobile rear end collisions and account for a large portion of automobile insurance claims. During such a collision, the occupant's head is first thrown backwards relative to the neck and torso, impacts the headrest, and is subsequently thrown forwards. Such an event may cause soft tissue injury and places excessive strain on the neck due to hyperextension, leading to whiplash injury. To reduce whiplash injury, the most common mechanism involves moving the headrest forward such that the distance between the head and the headrest is minimized. Such a mechanism is known as a head restraint mechanism and may be either static or active. The reduced distance between the head and the headrest implies that the relative accelerations between the head and neck, or T1 and C1 vertebrae are reduced, thereby reducing the possibility of whiplash injury.

A disadvantage of existing mechanisms is that the activation of the head restraint mechanism usually occurs only after the occupant has been thrown rearward against the back seat. There still exists a need for a head restraint system that activates in advance of or concurrently with the rearward movement of the occupant's torso and does not rely on expensive sensors and circuitry to detect and activate the head restraint system.

SUMMARY OF THE INVENTION

Briefly, the present invention provides an active head restraint system comprising a fluid driver assembly coupled to a vehicle seat assembly. The fluid driver assembly is actuatable in response to a predetermined relative movement between the vehicle seat assembly and the vehicle frame. A fluid driven assembly is in fluid communication with the fluid driver assembly. The fluid driven assembly is actuated in response to actuation of the fluid driver assembly. A headrest is pivotable about an axis. The headrest is coupled to the fluid driven assembly such that the fluid driven assembly pivots the headrest about the axis during actuation of the fluid driver assembly.

Further, the present invention discloses a vehicle seat comprising a seat portion slidably coupled to a vehicle frame, a back portion coupled to the seat portion, and a headrest pivotally coupled to the back portion. A driver actuator is coupled to the seat portion and configured for operation upon movement of the seat portion relative to the vehicle frame. A driven actuator is coupled to the back portion and is in fluid communication with the driver actuator. A headrest actuator is operatively coupled to the driven actuator and to the headrest to pivot the headrest relative to the back portion upon activation of the driver actuator.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
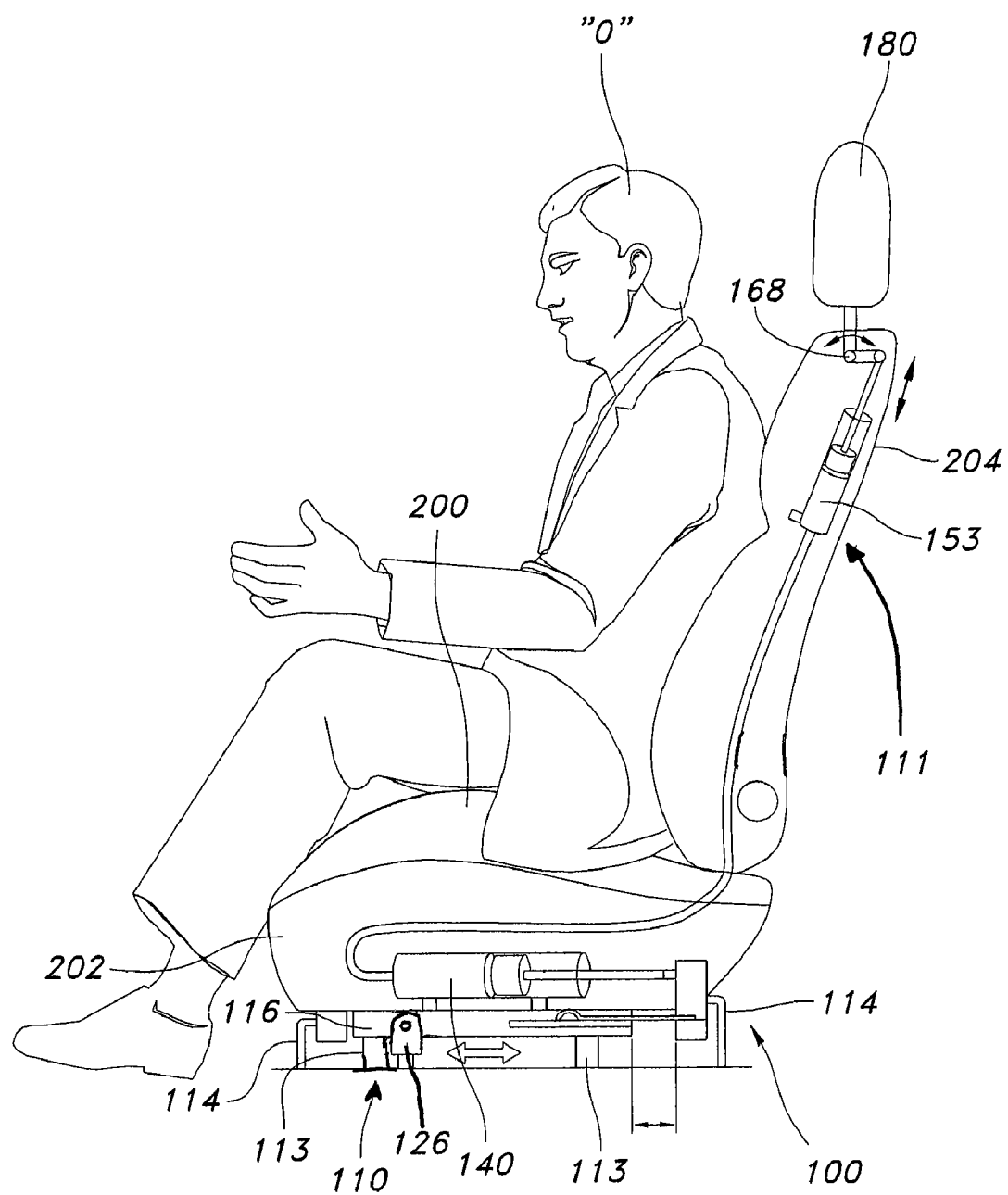
FIG. 1 is a schematic view of a vehicle seat safety system according to an exemplary embodiment of the present invention.

Referring to the figures in general, a vehicle seat safety system 100 is shown. System 100 includes a fluid driver assembly 140 coupled to a vehicle seat assembly 200. Fluid driver assembly 140 is actuatable in response to a predetermined movement of vehicle seat assembly 200. A fluid driven assembly 153 is in fluid communication with fluid driver assembly 140. Fluid driven assembly 153 is actuated in response to actuation of fluid driver assembly 140. A headrest 180 is pivotable about an axis 168. Headrest 180 is coupled to fluid driven assembly 153 such that fluid driven assembly 153 pivots headrest 180 about axis 168 during actuation of fluid driven assembly 153.

System 100 includes a seat mechanism 110 fluidly coupled to a back/headrest mechanism 111. As shown in FIG. 1, seat mechanism 110 is disposed within a seat 202 and back/headrest mechanism 111 is disposed within and extending from a seatback 204.

Figure 2:
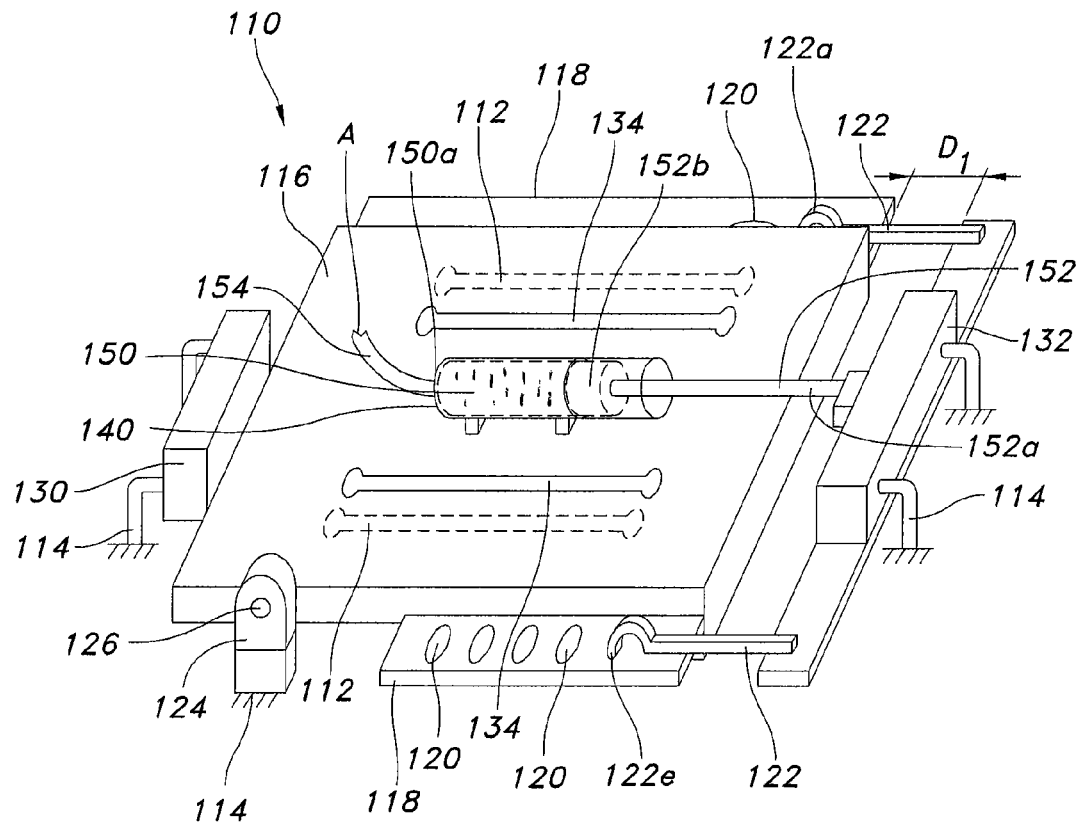
FIG. 2 is a perspective view of a fluid driver assembly of the vehicle seat safety system shown in FIG. 1.

Referring to FIG. 2, seat mechanism 110 includes a pair of longitudinally extending rail slots 112 (shown in phantom lines) on the underside of base 116 that ride on rails 113 (shown in FIG. 1) fixedly coupled to a frame 114 of the vehicle in which system 100 is installed. Rail slots 112 are parallel with each other and extend in a longitudinal direction along the vehicle. A base platform 116 is slidably mounted onto rails 113 such that base platform 116 may longitudinally translate along rails 113.

Base platform 116 includes a pair of flanges 118 extending from the longitudinal sides thereof. Each flange 118 includes a row of closely spaced engagement openings 120 for engaging a hook 122 during operation of system 100. Once hook 122 engages an engagement opening 120, it can continue to engage openings ahead of (in the direction of front stop 130) the currently engaged opening, but cannot disengage a first opening 120 to engage another opening located behind (in the direction of rear stop 132) Thus the operation of hook 122 and the engagement openings 120 is similar to a ratchet and pawl mechanism, to allow for relative motion between base platform 116 and vehicle floor 114 to occur only in one direction that serves to reduce the gap "D1". This general description of the function and schematic illustration of hook 122 and openings 120 is meant to be explanatory in nature and the accompanying figure (FIG. 2) merely to generally illustrate the function. The actual design of the hook, openings, and additional components, such as springs and hinges to force the hook into the openings under the speed and forces present in actual use conditions, may be accomplished in a number of different ways by someone skilled in the art.

Base platform 116 is restrained against longitudinal motion relative to forward motion of the vehicle by a shear pin stop 124 that is fixed to frame 114. Shear pin stop 124 includes a shear pin 126 that releasably couples shear pin stop 124 to base platform 116. Shear pin 126 may be sized to shear upon encountering a predetermined shear force that is estimated based on the typical size/weight of the occupant in seat assembly 200 and the typical impact force of the rear end collision transmitted to the shear pin stop 124. In one embodiment illustrated in FIG. 2, the shear pin may be designed to be sheared by an occupant corresponding to a $50^{th}$ percentile anthropomorphic dummy that represents the median of the population. In an alternate embodiment (not shown), a plurality of shear pins may be provided: a first pin designed for a $5^{th}$ percentile occupant, and a second pin with greater shear resistance (or when combined with the first pin providing a collectively larger shear resistance) designed for a heavier occupant, such as, for example, a $95^{th}$ percentile occupant. To ensure that the second pin is only inserted when a larger occupant is present in the seat, such an embodiment may comprise a mechanical linkage (not shown) that couples deflection of the seat base 202 underneath the occupant's weight to a lever that mechanically inserts the additional shear pin of suitable shear strength into an associated shear pin stop. Any number of such linkages can be devised by one skilled in the art, and no particular embodiment is preferred; accordingly, no exemplary embodiment is illustrated here. Although illustrated with one shear pin in FIG. 2, and an alternative embodiment described with two shear pins, more than two such pins may be provided to provide a finer adjustability for weight of the occupant.

A front stop 130, fixed to frame 114, is disposed against a forward edge of base platform 116 to prevent base platform 116 from translating beyond front stop 130. A rear stop 132, also fixed to frame 114, is spaced a predetermined distance "D1" from the rear of base platform 116. Hooks 122 are pivotally mounted on rear stop 132 such that a grasping end 122a of each hook 122 rests on each respective flange 118 slightly behind the first respective engagement opening 120. Because the relative sliding is based upon the impact force and may be any distance between zero and D1, hooks 122 are engaged in openings 120 at every incremental distance between openings 120 to prevent base platform 116 from sliding forward with respect to the vehicle floor 114 which could lead to an impact force being exerted on front stop 130 and also undesirable suction of fluid backwards from the driven assembly to the driver assembly.

A pair of longitudinally extending seat rail slots 134 extend parallel to each other in a longitudinal direction along the top of base platform 116. Seat 202 is typically mounted to seat rails (not shown), which fit in slots 134 to couple seat 202 (shown in FIG. 1) to base platform 116. Seat 202 and its associated rails may then be adjusted longitudinally relative to base platform 116 along seat rail slots 134 in any known manner. As noted above, vehicle floor has a set of rails 113 (shown in FIG. 1) that interface with slots 112 (shown in FIG. 2) that allow base platform 116 to slide back and forth along the vehicle floor once the shear pin 124 is broken. This creates the relative motion needed for activating the fluid driver assembly. Set of slots 134 on the top surface of the base platform are for mounting seat 202 such that the seat and attached seat rails can slide back and forth along these slots, so that the passenger can adjust their seat comfortably. The sliding of the seat along slots 134 is not critical to the operation of the anti whiplash mechanism, but is illustrated here to show that seat 202 can be translated based on the passenger's desired leg room without affecting the operation of the anti whiplash mechanism.

A fluid driver assembly 140 is mounted on base platform 116. Fluid driver assembly 140 includes a hydraulic actuating cylinder 150 mounted on base platform 116, between seat rails 134. Hydraulic actuating cylinder 150 includes a piston rod 152 that has a first end 152a fixedly coupled to rear stop 132 to prevent longitudinal translation of piston rod 152 relative to vehicle frame 114. A second end 152b of piston rod 152 is disposed within hydraulic actuating cylinder 150. Hydraulic actuating cylinder 150 and base platform 116 are together longitudinally translatable toward first end 152a of piston rod 152 when system 100 is activated.

Hydraulic actuating cylinder 150 is filled with a hydraulic fluid. A fluid transfer conduit 154 is in fluid communication with the fluid in hydraulic actuating cylinder 150 and transfers the hydraulic fluid to a fluid driven assembly 153, such as a hydraulic receiver 156, in back and headrest assembly 111, shown in FIG. 3. A forward end 150a of hydraulic actuating cylinder 150 may be tapered toward fluid transfer conduit 154 to provide a smoother transfer of hydraulic fluid from hydraulic actuating cylinder 150 to fluid transfer conduit 154.

Fluid transfer conduit 154 is sufficiently long to allow seat rails 134 and, consequently, seat 202, to be adjusted along a length of base platform 116 without adversely affecting the structure and/or operation of system 100. Fluid transfer conduit 154 may be constructed from plastic, rubber, or any other suitable, flexible material.

Figure 3:
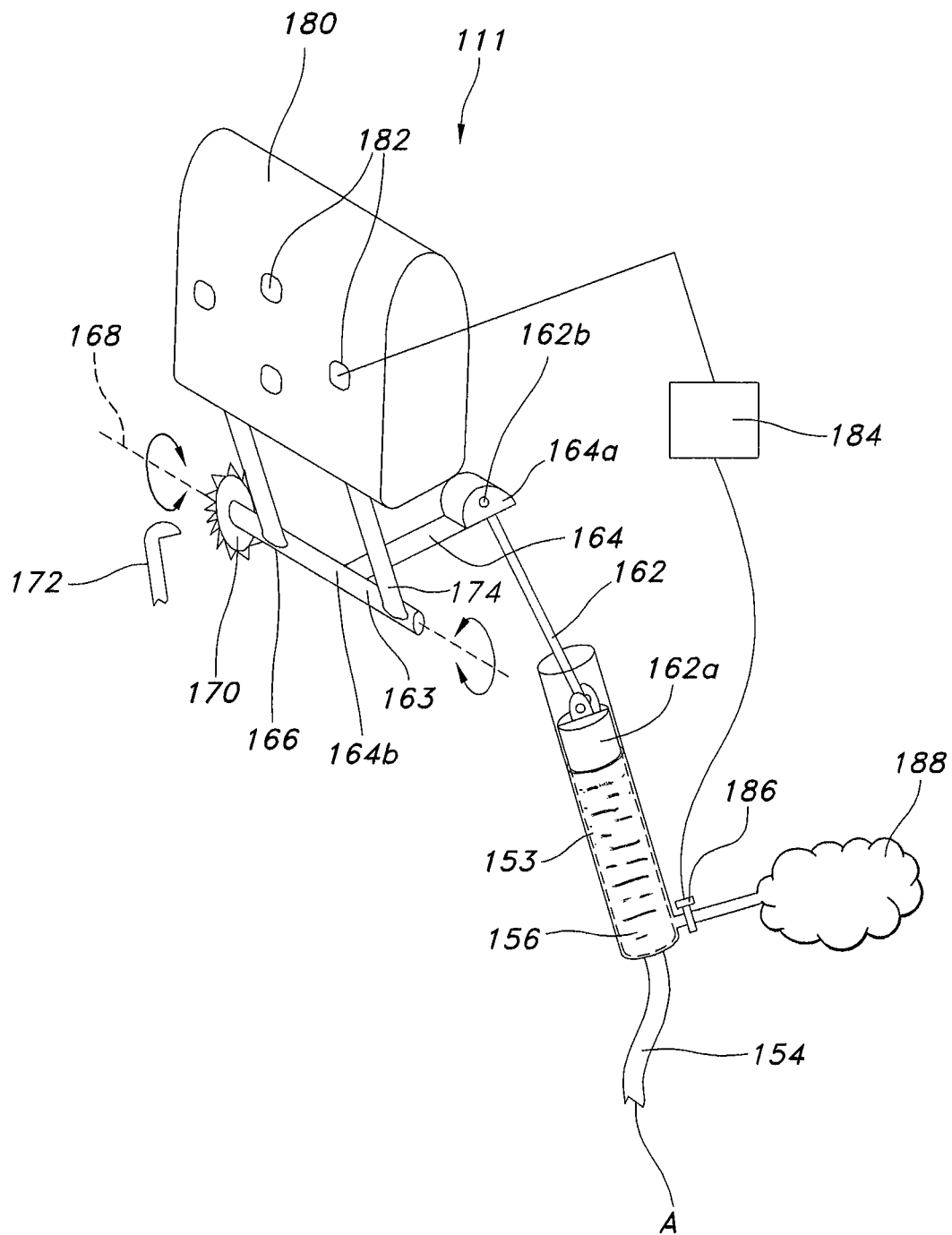
FIG. 3 is a perspective view of a fluid driven assembly of the vehicle seat safety system shown in FIG. 1.

Referring to FIG. 3, hydraulic receiver 156 includes a piston rod 162 that has a first end 162a disposed within hydraulic receiver 156 and a second end 162b pivotally coupled to a headrest actuator 163. Headrest actuator 163 includes a torque bar 164 having a free end 164a to which second end 162b of piston rod 162 is pivotally coupled. Torque bar 164 also includes a coupled end 164b that forms a headrest frame 166. Headrest frame 166 is pivotally mounted about a headrest axis 168. A ratchet 170 is fixedly mounted to headrest frame 166 such that ratchet 170 is also rotatable about headrest axis 168. A latching pawl 172 operatively engages ratchet 170 to allow headrest frame 166 to rotate in one direction (i.e., counter-clockwise as shown in FIG. 1), but prevent rotation of headrest frame 166 in an opposing direction.

Headrest frame 166 also includes at least one headrest support 174 extending therefrom, onto which a headrest 180 may be adjustably mounted. In one embodiment, is headrest 180 includes a plurality of sensors 182 which measure the contact force between the occupant's head and headrest 180 upon impact. Sensors 182 transmit a signal to a control system 184. Control system 184 is operatively coupled to a bleed valve 186 that is fluidly coupled to hydraulic receiver 156. Bleed valve 186 discharges excess hydraulic fluid from hydraulic receiver 156 to a bleed receiver 188. Bleed receiver 188 may be, for example, a flexible plastic bag located within seat back 204.

In another embodiment, no sensors or control unit are used. A mechanical bleed 186 valve attached to the hydraulic receiver 156 is configured to actuate at some predetermined pressure of the fluid in the hydraulic receiver. The fluid pressure buildup over and above the pressure required to actuate the forward pivoting of the headrest is caused by the force exerted by the occupant's head against the headrest which attempts to retard the forward pivoting motion of the headrest.

Prior to actuation, referring to FIG. 2, base platform 116 is disposed against front stop 130. Hydraulic actuating cylinder 150 is positioned relative to second end 152b of piston rod 152 such that second end 152b of piston rod 152 is disposed toward a rear end of hydraulic actuating cylinder 150 so that hydraulic actuating cylinder 150 is generally full of hydraulic fluid.

Referring to FIG. 3, first end 162a of piston rod 162 is disposed toward the bottom of hydraulic receiver 156, and above bleed valve 186, such that hydraulic receiver 156 is partially filled with hydraulic fluid. The position of piston rod 162 allows headrest 180 to be located in a normal, "non-actuated" condition.

Figure 4:
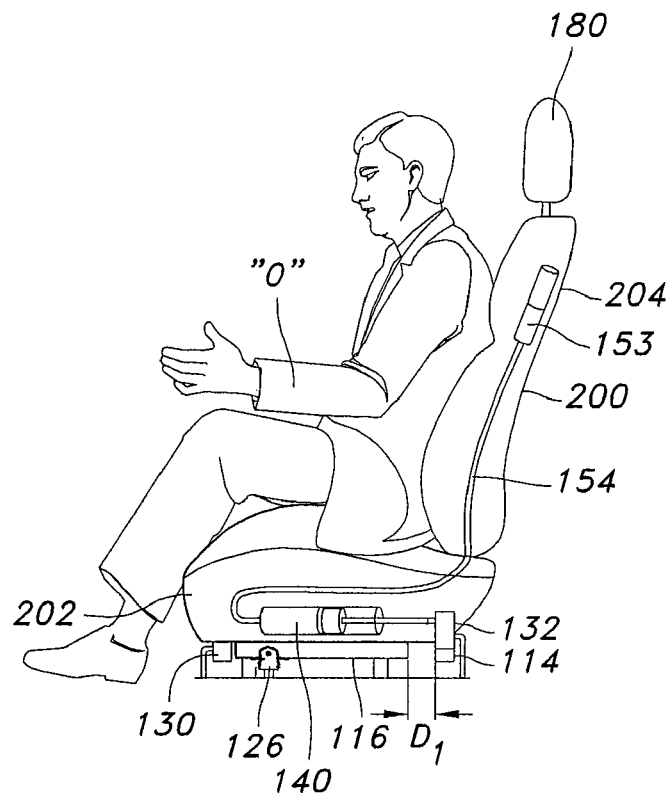
FIG. 4 is a schematic drawing of the vehicle safety seat system of FIG. 1 in a "non-actuated" position.

System 100 is shown in FIG. 4 in a "non-actuated" position. Occupant "O" is seated on seat 202, with its back resting against backrest 204. The head of occupant "O" is spaced away from headrest 180. Headrest 180 is in a normal, "non-actuated" position. Base platform 116 is against front stop 130, with distance D1 between base platform 116 and rear stop 132. In an exemplary embodiment, distance D1 may be between about 2 cm and about 3 cm. Shear pin 126 maintains base platform 116 in its position against front stop 130. Fluid driver assembly 140 is in fluid communication with fluid driven assembly 153 through conduit 154.

Referring to FIGS. 1-3 and 5-6, system 100 is actuated by a sudden forward motion of the vehicle in which system 100 is installed, such as for example, in a rear end collision. In a rear end collision, the impact of the collision will tend to drive frame 114 of the vehicle forward (to the left in FIG. 2). Base platform 116, however, being slidably mounted on rails 113 that engage slots 112 in the frame 114, is prevented from such sliding relative to the frame 114 by shear pin 126 that constrains base platform 116 to remain held in place. Such a constraint generates a shear force in shear pin 126. In step 300 of FIG. 6, when the shear force exceeds the shear strength of shear pin 126, shear pin 126 shears, breaking the bond between frame 114 and base platform 116, releasing base platform 116 from frame 114. In step 302 of FIG. 6, base platform 116 then translates along rails 113 toward rear stop 132 to the position shown in FIG. 5, or if visually considering a different frame of reference, frame 114 and rear stop 132 move forward relative to base platform 116.

Figure 5:
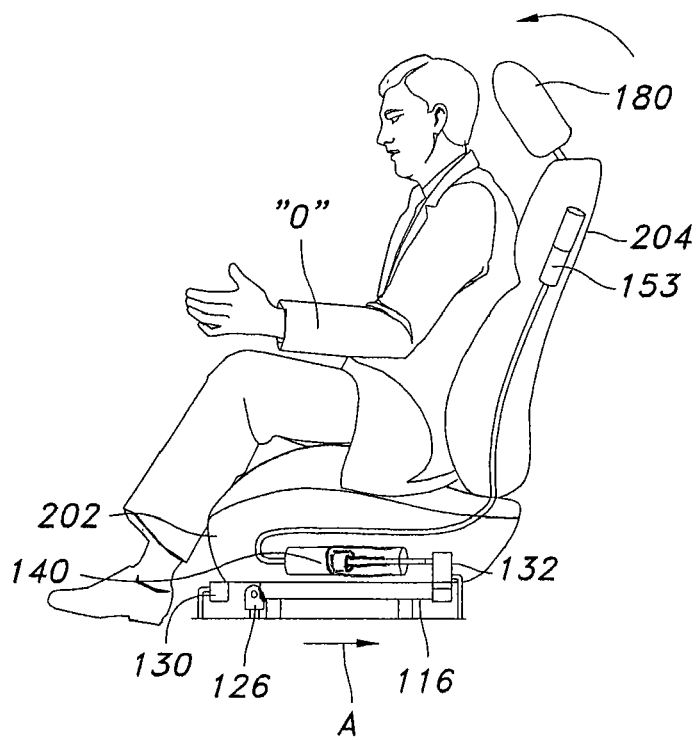
FIG. 5 is a schematic drawing of the vehicle safety seat system of FIG. 1 in an "actuated" position.
Figure 6:
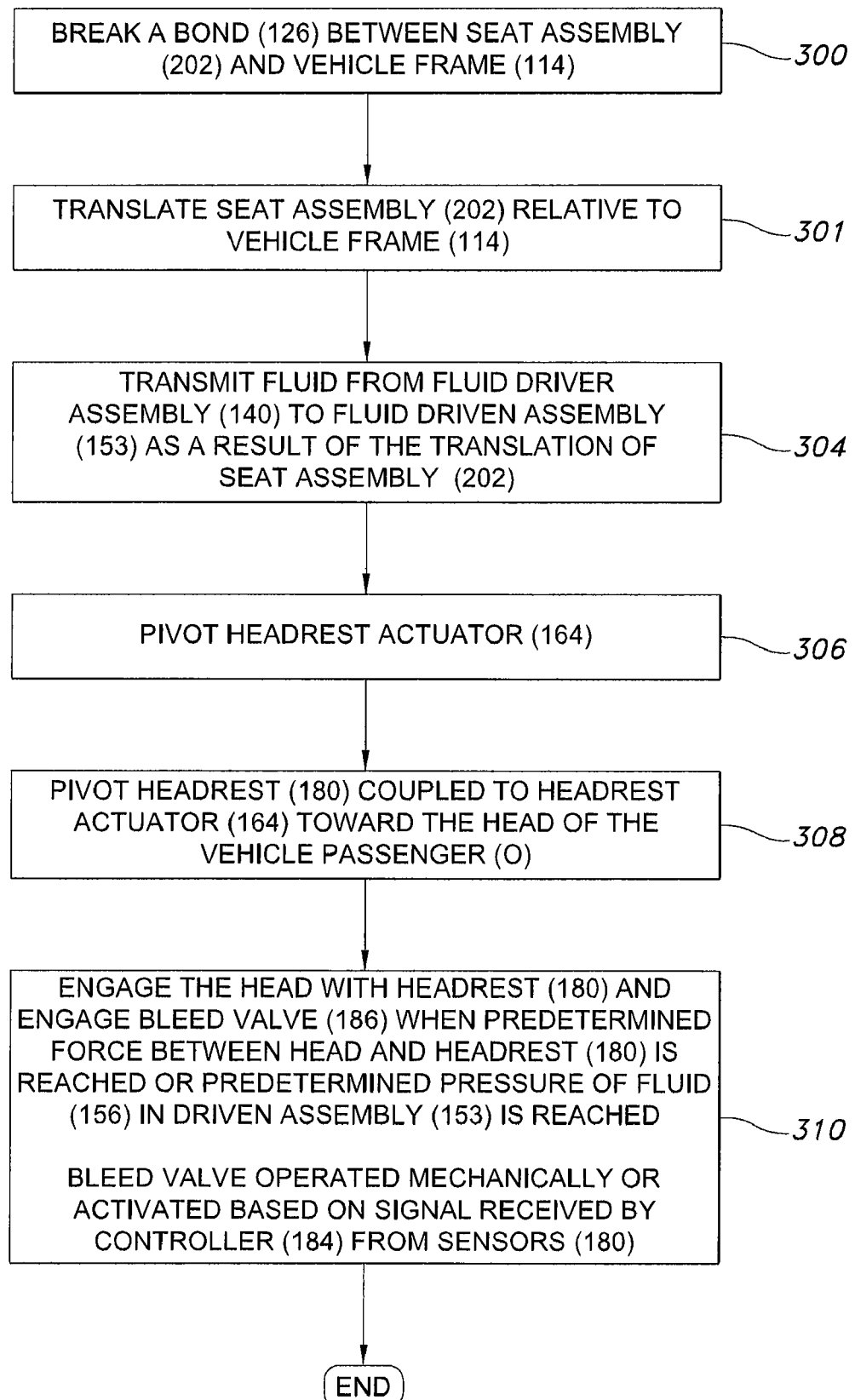
FIG. 6 is a flowchart illustrating operation of the vehicle seat safety system of FIG. 1.

In step 304 of FIG. 6, as base platform 116 slides away from front stop 130 toward rear stop 132 (shown by arrow "A" in FIG. 5), piston end 152b of piston rod 152 is driven into hydraulic actuating cylinder 150, forcing hydraulic fluid in hydraulic actuating cylinder 150 through fluid transfer conduit 154 and into hydraulic receiver 156 in back/headrest assembly 160. The hydraulic fluid entering hydraulic receiver 156 acts upon first piston end 162a of piston rod 162, driving piston rod 162 out of hydraulic receiver 156.

Further, as base platform 116 translates toward rear stop 132, grasping ends 122a of each hook 122 sequentially engage each respective engagement opening 120 to restrict movement of base platform 116 and prevent base platform 116 from translating forwards toward front stop 130 once the backward motion ceases. Distance D1 between the rear of base platform 116 and rear stop 132 is sized with the size of hydraulic actuating cylinder 150 and hydraulic receiver 156 and fluid transfer conduit 154 in order to calibrate the rate of hydraulic fluid flow from hydraulic actuating cylinder 150 into hydraulic receiver 156, thus governing the speed and amount of rotation of headrest 180 during actuation of system 100.

Hydraulic actuating cylinder 150 may have a larger diameter than hydraulic receiver 156 so that, when hydraulic fluid is expelled from hydraulic actuating cylinder 150, through fluid transfer conduit 154 into hydraulic receiver 156, a small movement of hydraulic actuating cylinder 150 relative to piston rod 152 results in a larger movement of piston rod 162 relative to hydraulic receiver 156.

In steps 306 and 308 of FIG. 6, as piston rod 162 is forced from hydraulic receiver 156, second end 162b of piston rod 162 pivots free end 164a of headrest actuator 164 about headrest axis 168 such that headrest 180 is pivoted forward toward the head of occupant, as shown by arrow "B" in FIG. 5. Ratchet 170 engages latching pawl 172 to prevent headrest 180 from rotating in an opposite direction.

In step 310 of FIG. 6, in the event that the occupant's head snaps back against headrest 180, sensors 182 sense the contact and transmit a signal to control system 184, which in turn transmits a signal to bleed valve 186 to open bleed valve 186 so that hydraulic fluid, which was being forced from hydraulic actuating cylinder 150, through fluid transfer conduit 154 into hydraulic receiver 156, no longer enters hydraulic receiver 156, but is vented to receiver 188 through bleed valve 186. Such action prevents piston rod 162 from further pivoting headrest frame 166 about headrest axis 168 so that headrest 180 is no longer pivoting forward. This prevents the occupant's head from being forcibly pushed forwards. Bleed receiver 188 allows hydraulic fluid to be controllably released from bleed valve 186. In an alternative embodiment in which sensors 182 and control system 184 are eliminated and replaced with a mechanically operated bleed valve, as described elsewhere herein, when the occupant's head snaps back against the headrest, it creates sufficient fluid pressure within hydraulic receiver 156 to open the mechanically operated bleed valve at its predetermined threshold pressure.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An active head restraint system for a vehicle having a vehicle frame, the system comprising:
    a vehicle seat assembly coupled to and translatably movable relative to the vehicle frame;
    a fluid driver assembly having a first component coupled to the vehicle seat assembly and a second component fixedly coupled to the vehicle frame, the fluid driver assembly configured to convert movement of the vehicle seat assembly relative to the vehicle frame into a motive force for the fluid driver;
    a fluid driven assembly in fluid communication with and driven by the fluid driver assembly;
    a headrest pivotable about an axis, the headrest coupled to the fluid driven assembly and configured to pivot the headrest about the axis when actuated by the fluid driver assembly.

2. The active head restraint system according to claim 1, wherein the headrest is pivotable in a single direction.

3. The active head restraint system according to claim 1, wherein the fluid driver assembly is disposed within a seat portion of the seat assembly.

4. The active head restraint system according to claim 1, wherein the fluid driven assembly is disposed within a seatback portion of the seat assembly.

5. The active head restraint system according to claim 1, further comprising a shear member releasably securing the vehicle seat assembly to a frame.

6. The active head restraint system according to claim 1, further comprising a control system, wherein the control system comprises a sensor mounted in the headrest and wherein the fluid driven assembly comprises a bleed valve, wherein the control system is configured to receive a signal from the sensor and to transmit a signal to operate the bleed valve based on the signal received from the sensor.

7. The active head restraint system according to claim 1, wherein the fluid driven assembly comprises a mechanical bleed valve adapted to be activated when the pressure in the fluid driven assembly reaches a predetermined value.

8. A vehicle seat comprising:
- a seat portion coupled to a vehicle frame;
- a back portion coupled to the seat portion;
- a headrest pivotally coupled to the back portion;
- a driver actuator coupled to the seat portion and having a first component coupled to the seat portion and a second component fixedly coupled to the vehicle frame such that translation of the seat portion relative to the vehicle frame provides a motive force that actuates the driver actuator;
- a driven actuator coupled to the back portion and in fluid communication with the driver actuator; and
- a headrest actuator operatively coupled to the driven actuator and to the headrest to pivot the headrest relative to the back portion upon activation of the driver actuator.

9. The vehicle seat according to claim 8, wherein the seat portion comprises a shear member releasably coupling the seat portion to the vehicle frame.

10. The vehicle seat according to claim 8, wherein the headrest is pivotable in a single direction.

11. The vehicle seat according to claim 8, further comprising a control system, wherein the control system comprises a sensor mounted in the headrest and wherein the fluid driven assembly comprises a bleed valve, wherein the control system is configured to receive a signal from the sensor and to transmit a signal to operate the bleed valve based on the signal received from the sensor.

12. The vehicle seat according to claim 8, wherein the seat portion comprises a base platform and a seat slidingly and adjustably disposed on the base platform.

13. A method of actively restraining the head of a vehicle passenger in a rear-end collision comprising the steps of:
(a) translating a seat assembly relative to a vehicle frame;
(b) transmitting a fluid from a fluid driver assembly to a fluid driven assembly as a result of the translation of the seat assembly relative to the vehicle frame, the fluid driver assembly comprising a first component coupled to the seat assembly and a second component fixedly coupled to the vehicle frame;
(c) pivoting a headrest actuator coupled to the headrest to pivot the headrest toward the head of the vehicle passenger.

14. The method according to claim 13, further comprising the step of, prior to translating the seat assembly, breaking a bond between the seat assembly and the vehicle frame.

15. The method according to claim 13, wherein step (d) further comprises pivoting the headrest in only one direction.

16. The method according to claim 15, further comprising, after step (d), the step of engaging the head with the headrest and generating a signal to a controller to regulate the transmission of fluid from the fluid driver assembly to the fluid driven assembly.

17. The method according to claim 13, further comprising, after step (d), engaging the head with the headrest, thereby generating pressure in the fluid in the fluid driven assembly, which upon reaching a predetermined pressure value, activates a mechanical bleed valve that allows fluid to drain out of the fluid driven assembly, preventing further pivoting of the headrest.

18. The method of claim 13, wherein the step (a) comprises generating a threshold translation force sufficient to overcome a mechanical limitation that prevents translation of the seat assembly except upon generation of the threshold translation force.

19. The active head restraint system of claim 1, further comprising a limiter for mechanically preventing translation of the seat assembly relative to the vehicle frame except upon generation of a threshold translation force.

20. The active head restraint system according to claim 1, the vehicle seat assembly further comprising a limiter for mechanically preventing translation of the seat portion relative to the vehicle frame except upon generation of a threshold translation force.

* * * * *